318-135.  XR  3551764  SR

United States Patent

[11] 3,551,764

| | | | | |
|---|---|---|---|---|
| [72] | Inventor | Ernest B. Evans Valencia, Calif. | | |
| [21] | Appl. No. | 803,257 | | |
| [22] | Filed | Feb. 28, 1969 | | |
| [45] | Patented | Dec. 29, 1970 | | |
| [73] | Assignee | Lockheed Aircraft Corporation Burbank, Calif. | | |

[54] PIEZOELECTRIC LINEAR ACTUATOR
8 Claims, 4 Drawing Figs.

[52] U.S. Cl....................................................... 318/116,
310/8.1, 310/12, 318/135
[51] Int. Cl........................................................ H02n
[50] Field of Search............................................ 310/8.1,
8.3, 8.5, 26, 14, 72; 318/116, 118, 135, 20.705;
321/16

[56] References Cited
UNITED STATES PATENTS
3,063,001  11/1962  White.............................. 321/16
3,244,961  4/1966  Adler.............................. 318/20.705X
3,296,467  1/1967  Locher........................... 310/8.1
3,377,489  4/1968  Brisbane........................ 310/8.3
3,389,274  6/1968  Robertson...................... 310/8.3X Primary Examiner—D. F. Duggan
Attorneys—George C. Sullivan and Ralph M. Flygare ABSTRACT: An electrically-powered actuator is described having a selectively reversible, rectilinear, mechanical output. A fixed pair of piezoelectric elements is cyclically energized to provide a series of very small incremental displacements which cause an output member to move with a cumulative motion. One of the piezoelectric elements of the pair provides a controlled frictional restraint to clamp the output member while the remaining piezoelectric element imparts an incremental motion thereto. Staged elements increase the power output.

FIG_1

3,551,764
SHEET 3 OF 3
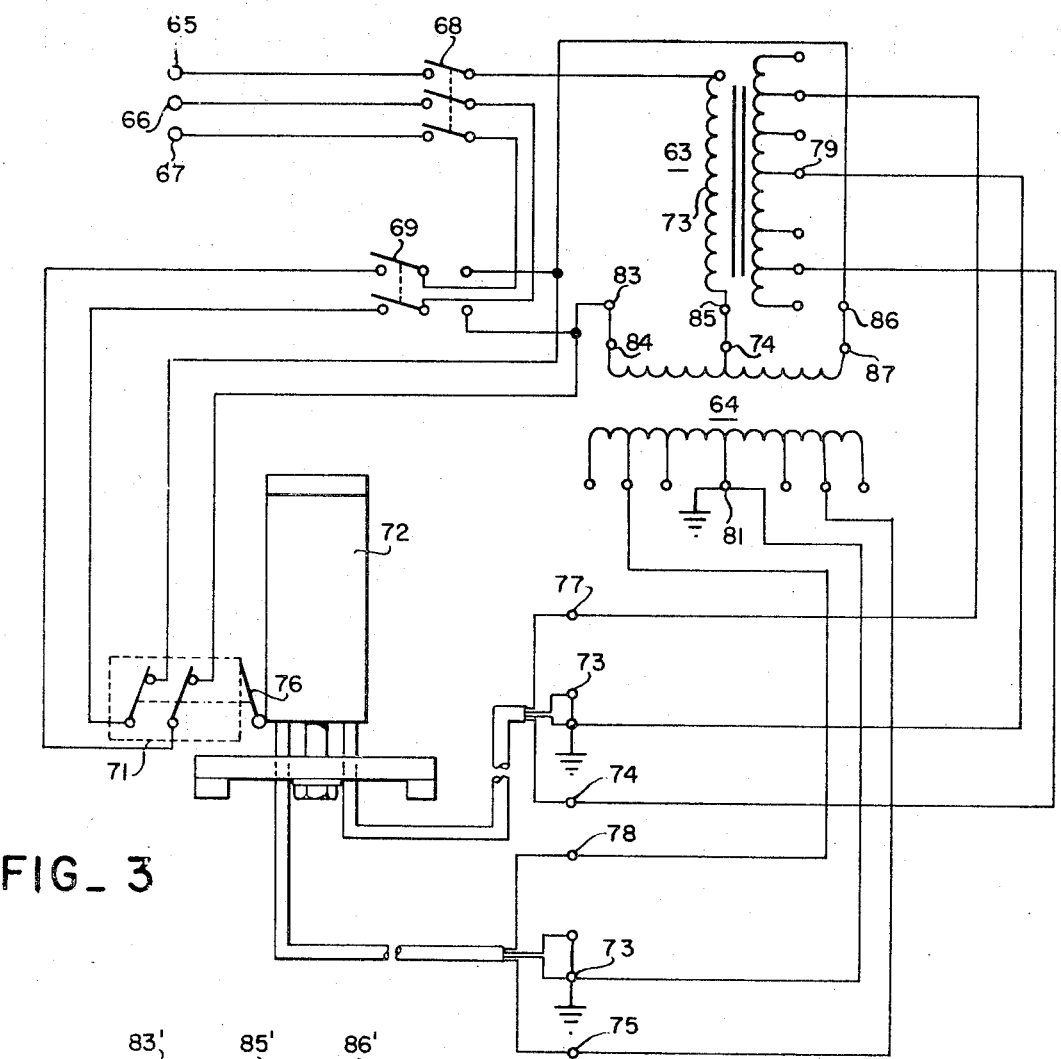
FIG_ 3
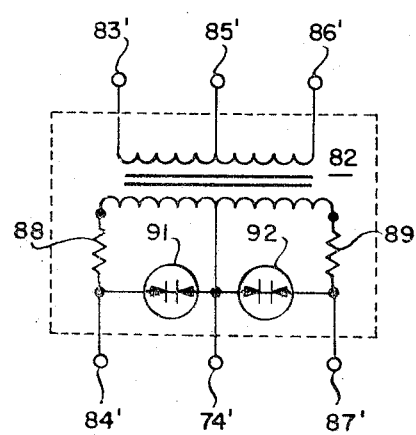
FIG_ 4
INVENTOR.
ERNEST B. EVANS 3,551,764

PIEZOELECTRIC LINEAR ACTUATOR

BACKGROUND OF THE INVENTION

A number of applications exist for electrically driven linear motors which are to function as prime movers to perform various mechanical operations. A number of devices have been suggested heretofore to accomplish this function. These have included both electromagnetic, magnetostrictive and piezoelectric devices. The simple electromagnetic devices include the well known solenoid actuator. Typical of the magnet magnetostrictive devices of the prior art are those described in U.S. Pat. Nos. 3,138,749 and 3,349,304. Also, various piezoelectric devices have been suggested heretofore.

The above-described prior art devices have been found unsuited for certain applications. For example, operating current and weight limitations encountered in aircraft applications have seriously restricted the use of certain of these prior devices.

SUMMARY OF THE INVENTION the preset invention comprises means for converting vibratory motion into unidirectional linear motion. Pairs of electrically energized piezoelectric elements cyclically drive the output member in a desired direction. By reason of its relatively light weight and low power consumption, the invention is particularly suitable as an actuator for aircraft applications. Specifically, piezoelectric materials are substantially lighter than the active element of magnetic and magnetostrictive devices employed for generally similar functions. Lead zirconate titanate (PZT) ceramics, for example, are capable of converting 0.036 joules of electrical energy, per cubic centimeter, into mechanical energy, per operating cycle. At ordinary operating temperatures, voltage induced stress and strain are of the order of 10,000 p.s.i. and $10^{-3}$ inches per inch, respectively. Operated as an acoustic transducer, PZt ceramic is capable of delivering 20 watts of acoustic power per cubic centimeter at 80 percent efficiency, at resonance, for a matched transducer at 1,000 Hz. Thus a powerful linear actuator may be made, incorporating this material, wherein vibratory motion at acoustic frequencies is converted into linear motion.

BRIEF DESCRIPTION OF THE DRAWINGS

FIG. 3 is a schematic wiring diagram of the apparatus of FIG. 1, including the related power supply.

FIG. 4 illustrates a modification of the apparatus of FIG. 3.

DESCRIPTION OF THE PREFERRED EMBODIMENT

Figure 1:
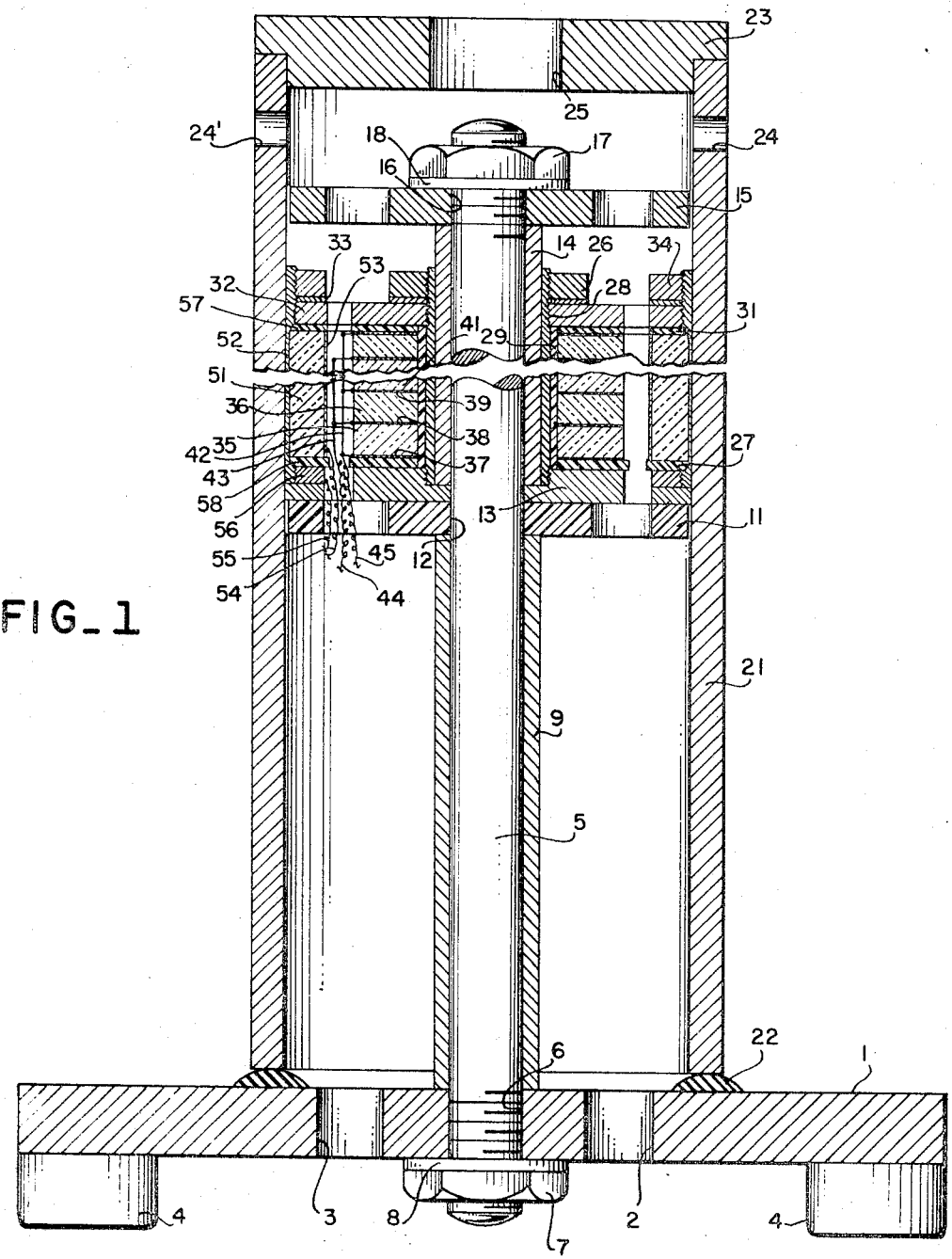
FIG. 1 is a cross section in elevation of a cylindrical piezoelectric linear actuator constructed in accordance with the invention.
Figure 2:
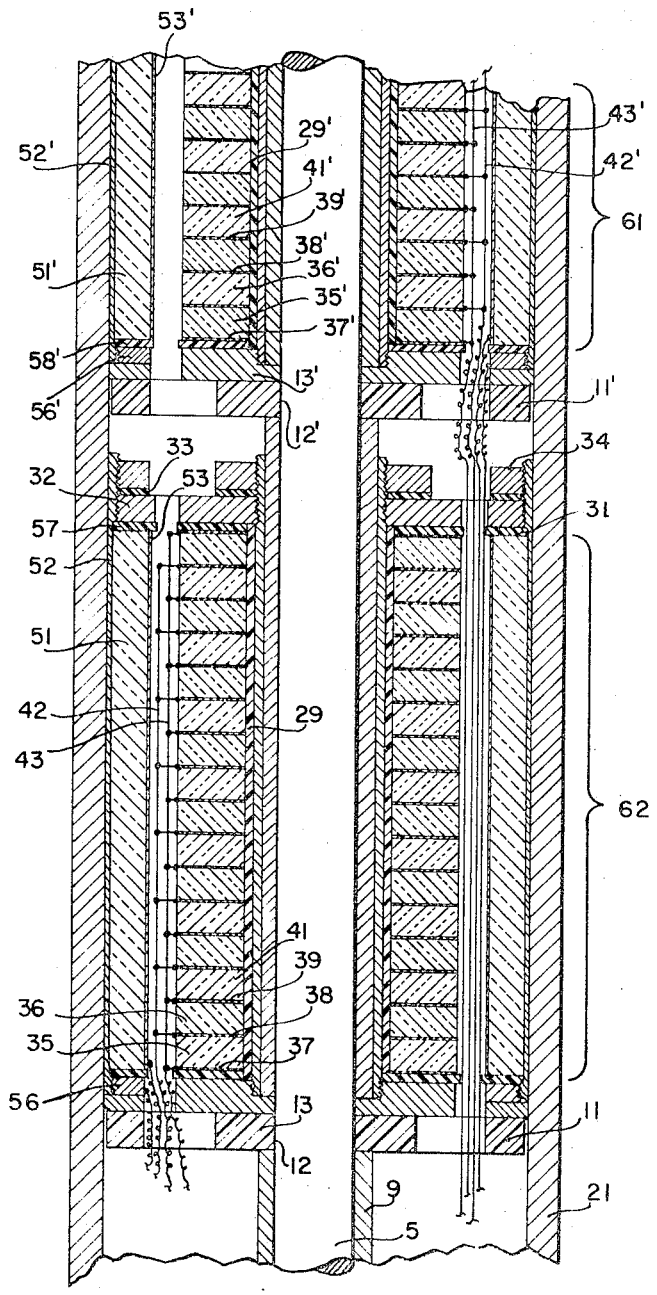
FIG. 2 is a fragmentary cross section, in elevation, of an actuator of the general type shown in FIG. 1, illustrating the manner of staging multiple actuator units.

The embodiment shown in FIGS. 1 and 2 comprises a stationary central rod and a rectilinearly displaceable external cylinder. The structure comprises a base plate 1 having apertures 2 and 3 therein for accommodating the passage of electrical conductors therethrough. The base plate 1 may include resilient feet 4 for supporting the structure. A central rod 5 extends upwardly through aperture 6 in plate 1. The lower end of rod 5 is provided with a threaded portion which mates with nut 7 and may include washer 8. A spacer tube 9, which may be fabricated from steel or other suitable material, is coaxially disposed with respect to rod 5. An insulating disc 11 is coaxially disposed with respect to rod 5 and has a central aperture 12 through which rod 5 extends. The external diameter of spacer tube 9 is greater than the diameter of aperture 12, whereby disc 11 will be supported by the tube 9. A circular disc 13, fabricated from steel or other suitable material, is axially disposed with respect to rod 5 and rests against insulating disc 11. A sleeve 14 extends upward from disc 13 and is coaxially disposed with respect to rod 5. Guide disc 15 is coaxially disposed with respect to rod 5 and abuts the upper end of sleeve 14. The upper end of rod 5 is provided with a threaded portion which extends through the central aperture 16 of disc 15 and carries nut 17 and washer 18. The foregoing structure remains stationary with respect to base plate 1. The actuator assembly is coaxially disposed about the central rod 5 and fits inside the actuator tube 21 portion of the actuator tube assembly. Actuator tube 21 comprises the moving output member of the device and is in the form of a hollow cylinder fabricated from steel or other similar material. Resilient bumper 22 is secured to base plate 1 and is disposed so as to engage the lower terminus of tube 21 when the actuator is in its initial deenergized condition. A cover disc 23 carries a flange portion which is adapted to mate with the upper peripheral edge of tube 21. Apertures 24 and 24' permit equalization of the ambient air pressure within and without the apparatus. Aperture 25 is provided to permit the actuator tube 21 to be secured to any suitable utilization equipment, not shown.

The piezoelectric actuator mechanism is disposed within actuator tube 21 and is secured between disc 13 and disc 26. An insulating disc 27 is coplanarly disposed and in contact with compression disc 13. A bias stress tube 28 encircles and is in contact with sleeve 14. This stress tube 28 is typically constructed of steel and has a wall thickness of 0.062 inch. An insulating tube 29 encircles and contacts stress tube 28. An upper insulating disc 31 is coaxially disposed with respect to tubes 28 and 29 and is coplanar with respect to insulating disc 27. Disc 32 is threadedly supported on stress tube 28 ad is also provided with peripheral screw threads. Lock washer 33 is located between disc 32 and locknut 34

A plurality of piezoelectric discs are disposed between insulating disc 27 and 31. Typical ones of these piezoelectric discs are indicated at 35 and 36. In a typical construction there may be 16 piezoelectric discs 35—36 arranged in a continuous stack. Each of these piezoelectric discs may be fabricated from a material such as Clevite PZT-4 ceramic. Discs 35—36 have the property of changing their physical dimension in response to an electrical charge suitably placed thereacross. The upper and lower surfaces of each piezoelectric disc 35 are provided with an electrode shim of so coextensive area. By way of example, piezoelectric disc 35 has its lower surface (as shown in FIG. 1) in contact with electrode shim 37 and the upper surface is in contact with electrode shim 38. As will be apparent, electrode shim 38—which is the upper electrode for disc 35—serves as the lower shim for piezoelectric disc 36. In a like manner, electrode shim 39 is interposed and in contact with piezoelectric discs 36 and 41. Every other electrode shim is connected to a corresponding one of the power supply buses. That is, electrode shims 37 and 41 are connected in common to supply bus 42. Electrode shim 38 is connected to supply bus 43. Leads 44 and 45 connect corresponding ones of supply buses 42 and 43 to an external power supply, as will be discussed in greater detail in connection with the description of FIGS. 3 and 4.

The electrode shims 37—39 may comprise nickel-plated copper foil discs or may comprise deposited conductive films and serve to establish an electric field across the piezoelectric discs to which they are attached. Insulating discs 27 and 31, and insulating tube 29 electrically isolate the piezoelectric discs 35, 36, and 41 from the remaining structure of the apparatus.

A cylindrical clutch tube 51 is coaxially disposed within actuator tube 21 and is separated therefrom by clutch lining electrode 52. The piezoelectric clutch 51 is fabricated from a material such as Clevite PZT-4 ceramic and has an electrode sleeve disposed in contacting relationship with respect to its inner wall. Lead wire 54 connects to electrode sleeve 53. The circuit path to the exterior wall of the clutch tube 51 is provided from lead wire 55 through locknut 56 to clutch lining electrode 52. The clutch lining electrode also serves as a bias stress tube and is preferably fabricated from steel. The lower end of the clutch tube is provided with a threaded interior portion which engages the peripheral portion of locknut 56. Similarly, the upper interior wall of clutch tube 51 is provided with a threaded portion which engages locknut 32, lockwasher 33, and locknut 34. The upper and lower surfaces of clutch tube 51 are in contact with insulating rings 57 and 58, respectively The fit between the actuator element assembly and the tube 21 is such that when voltage is applied to the piezoelectric clutch tube 51 the tube expands so that the clutch lining grips the interior surface of the actuator tube 21. Conversely, when the voltage is removed, or its polarity is changed, the clutch releases the tube 21. An alternating voltage, from a source to be described hereinafter in connection with FIG. 3, is applied in synchronism to both the stack of piezoelectric discs 35—36 and to the piezoelectric clutch tube 51. The discs 35—36 are connected in parallel and the voltage applied thereto is so phased with respect to the voltage applied to the clutch tube 51, that the actuator tube 21 will be gripped only when the transducer motion is in a single direction.

The velocity of displacement of the actuator tube 21 may be controlled by altering the phase of the voltage applied to the clutch 51 as compared to the voltage applied to the actuation discs 35—36. Furthermore, the direction of motion may be reversed by appropriately reversing the polarity of the applied voltages.

In the interest of simplicity and clarity, only a single actuator assembly is shown in the embodiment of FIG. 1. However, it should be understood that any desired number of actuator assemblies may be coaxially disposed in tandem along the longitudinal axis of the actuator tube, and the applied voltages be so phased that the force will be additive in a given direction. Also, by this means a more uniform motion results as the number of actuator assemblies is increased. There is shown in FIG. 2 a tandem pair of actuator assemblies 61 and 62, respectively, which permit actuator movement during both halves of the alternating cycle of the applied operating voltage. In effect, this accomplishes full-wave rectification of the input power to provide unidirectional linear motion, in contrast with the half wave or periodic propulsion obtained when only a single actuator assembly is used. Thus, the translational motion of the embodiment shown in FIG. 2 is smoother and twice as fast as that of the embodiment of FIG. 1.

As mentioned previously, it is desirable that the clutch grip the actuator tube 21 while the motion of the stack of actuator discs is in the desired output direction. Thus, it follows that the voltage applied to the clutch be 90° out of phase with the voltage applied to the stack of actuator discs 35—36. There is shown in FIG. 3 a power supply for providing the desired phase quadrature operating potentials. This circuit comprises a three phase AC supply having an operating frequency between 400 and 800 Hz. The 90° phase relationship is obtained by means of transformers having a Scott connection. Each transformer secondary is center-tapped so that the voltage may be applied to two actuator assemblies of the type shown in FIG. 2, 180° out of phase, and full-wave rectification of the vibratory motion into unidirectional linear motion is obtained. As will be understood, this results in a push-pull drive. Reconnection of the supply by means of switch 69 so as to reverse the phase of the voltage applied to each clutch will result in the reversal of the direction of the actuator's travel.

There is shown in FIG. 3 a schematic wiring diagram of a power supply suitable for operation of the actuator apparatus of FIG. 2. The power supply comprises transformers 63 and 64 for changing the prime power source voltages to the proper operating voltages. Three-phase alternating current is supplied to power input terminals 65—67. Main power switch 68 turns the apparatus off and on. Also, included is switch 69 for reversing the direction of travel and limit switch 71 to shut off the power before the end of the downward stroke. The connection of the three-phase AC power, via switches 68, 69 and 71, to transformers 63 and 64 comprises what is known to those versed in the art as a "Scott connection." In this arrangement, the voltage at terminal 65 is applied to one end of the primary winding 73. The other end of winding 73 connects to the center tap 74 of the primary winding of transformer 64. The voltage at terminal 66 is applied to one or the other ends of the primary winding of transformer 64, depending upon the setting of reversing switch 69. Similarly, terminal 67 connects to the remaining end of the primary winding of transformer 64 via the reversing switch 69.

Operating potential for the lower set of actuator elements is applied to terminals 73 and 74 from the secondary winding of transformer 63. The phase-displaced operating potential for the lower clutch element is applied to terminals 73 and 75 from the secondary winding of transformer 64. Similarly, the upper set of actuator elements obtains a 180° displaced drive voltage—with respect to the drive voltage of the lower set of actuator elements—via terminal 77. The 180° displaced voltage for the upper clutch appears at terminal 78.

For maximum operating efficiency each clutch should be in the high force or engaged half cycle while the motion of the related actuation elements is in the direction of the desired actuator output motion. Conversely, it should be in the low force or released half cycle while the motion of the actuator is in the opposite direction. For a low impedance power source the clutch force and the actuator element motion are essentially in time phase with the voltage applied to each. That is, the voltage applied to the clutch should be 90° out of phase with the voltage applied to the actuator element. This requirement is provided by the Scott-connected transformer arrangement of FIG. 3.

In a typical construction the preferred operating voltage for the actuator 72 is approximately 3100 volts RMS for a maximum piezoelectric ceramic temperature of 100° C. This voltage level is dictated by the thickness of the PZT–4 material, which in the embodiment of FIGS. 1—2 has a thickness of 0.250 inches. Taps on the secondary windings of transformers 63 and 64 step up the prime supply voltage to the required value.

It is preferred that the center operating frequency be of the order of 600 Hz although in most instances it will be desirable to employ a variable frequency supply. The power output of the actuator 72 is directly proportional to frequency up to the limitations imposed by heating and other considerations. The apparatus may be operated in either a resonant or a nonresonant mode.

As will be apparent to those versed in the art, the power supply described above provides a sine wave output. As will be readily understood, the sine wave power may be replaced by square wave power in order to improve the operating efficiency of the apparatus. Also, it will be recognized that a frequency other than that mentioned above may be desired for specific applications. Higher frequency produces proportionally higher power output and speed of motion. The upper frequency limit is dictated by the physical parameters of the tubular ceramic clutch element (e.g., clutch tube 51 of FIG. 1). The upper limit may be increased by using a stack of ceramic plates for the clutch actuation in lieu of the integral cylinder shown in FIG. 1.

As mentioned previously, the most effective voltage wave shape for application to the clutch is a square wave since this will permit movement of the maximum load for the entire stroke in the actuation direction, and a complete release during the return stroke. Certain practical applications will require, however, the use of a sinusoidal drive voltage. In the event that the loss of efficiency from operation from sinusoidal power cannot be tolerated, then the modification of FIG. 4 may be employed.

There is shown in FIG. 4 a modification of the power supply which provides square-wave power in lieu of sine wave power. The use of a square wave shape permits movement of the maximum load during the entire stroke of the actuation element motion and complete release for the return stroke. This modification comprises a second step up transformer 82 having a turns ratio of approximately 4:1 which is to be interposed between the prime power source and the actuator clutch input transformer 64. Specifically, the link between terminals 83 and 84 would be removed and terminal 83' and 84' interposed therefor. Likewise, the link between terminals 85 and 74 will be removed and terminals 85' and 74' interposed therebetween. Lastly, the link between terminals 86 and 87 will be replaced by the connection of respective ones of terminals 86' and 87'.

Resistors 88 and 89 connected in series with the input of the clutch transformer windings 82 and back-to-back zener diodes 91 and 92 connected in parallel with the clutch transformer windings 82, converts the sine wave output of transformer 82 to a square wave shape.

The apparatus described in connection with FIGS. 1 and 2 may be modified so that the fit between the clutch tube 51 and the exterior outer tube 21 is such that when voltage of one polarity is applied to the clutch it contracts and, when energized, releases. When the voltage is removed or reversed in polarity the clutch tube expands and grips the interior surface of the actuator tube 21. This alternative arrangement prevents the actuator tube 21 from being displaced as a result of external forces such as by a weight being lifted, when the drive voltage is removed. However, this alternative arrangement requires that a DC voltage of appropriate polarity be applied to the clutch during assembly of the device, in order to contract the clutch tube while the actuator tube is being slipped over the clutch.

I claim:

1. An electromechanical actuator comprising:
a fixed support member;
a linearly displaceable output member;
drive means fixedly supported by said support member and responsive to applied electrical drive potentials for producing discrete increments of rectilinear mechanical displacement if in a given direction;
clutch means interposed in contacting relationship between said displacement producing means and said output member for controlling the amount of friction therebetween in response to applied electrical clutch-control potentials and
means for controlling the phase of said drive potential with respect to said clutch potential and thereby cause said clutch means to frictionally couple said output member to said displacement producing means while the motion of said displacement producing means is in said given direction.

2. An electromechanical actuator as defined in claim 1 wherein said displacement producing means comprises a piezoelectric element.

3. An electromechanical actuator as defined in claim 1 wherein said clutch means comprises a piezoelectric element.

4. An electromechanical actuator as defined in claim 1 wherein said rectilinear displacement producing means comprises a plurality piezoelectric discs having a central aperture therethrough and through which said fixed support member extends in supporting relationship.

5. An electromechanical actuator as defined in claim 1 including a polyphase alternating current power supply for providing said electrical drive and said electrical clutch potentials at a frequency corresponding to the resonant mode of said actuator.

6. An electromechanical linear actuator comprising:
a fixed support member;
motive power means comprising a piezoelectric disc supported by said support member for producing a discrete increment of rectilinear mechanical displacement in the direction of the disc's axis whenever an electrical potential from a first power source is applied thereto;
a linearly displaceable output member;
clutch means comprising a hollow piezoelectric cylinder interposed between said motive power means and said output member, said clutch means being responsive to an electrical potential from a second power source to radially expand and thereby change the resistance to relative motion between said motive power means and said output member; and
cyclically operable means for changing the phase of the electrical potential from said first power source with respect to the electrical potential from said second power source and thereby cause said clutch means to transfer the rectilinear motion of said motive power means to said output member.

7. An electromechanical actuator comprising:
a fixed support member;
a linearly displaceable output member;
a plurality of piezoelectric discs having a central aperture therethrough and through which said fixed support member extends in supporting relationship, said discs being responsive to applied electrical drive potentials for producing discrete increments of mechanical displacement in a given direction;
clutch means, interposed in contacting relationship between said discs and said output member, including a piezoelectric cylinder encircling a said discs and responsive to applied electrical clutch control potentials for controlling the amount of friction between said discs and said output member; and
means for controlling the phase of said drive potentials with respect to said clutch control potentials and thereby cause said clutch means to be frictionally urged against said output member while the motion of said discs is in said given direction.

8. An electromechanical linear actuator comprising;
a fixed support member;
a linearly displaceable output member;
first drive means carried by said support member and responsive to a first applied electrical drive potential for producing an increment of rectilinear mechanical displacement in a given direction;
second drive means carried by said support member and responsive to a second applied drive potential for producing an increment of rectilinear displacement in said given direction;
first clutch means interposed between said first and second drive means and said output member, and responsive to an applied electrical clutch control potential for controlling the amount of friction between said first drive means and said output member;
second clutch means interposed between said second drive means and said output member, and responsive to an applied electrical clutch control potential for controlling the amount of friction between said second drive means and said output member; and,
a polyphase alternating current power supply means for applying an electrical drive potential to said first drive means which is 180° out of phase with the electrical drive signal supplied to said second drive means and for supplying clutch control potentials which an are in phase quadrature with respect to corresponding electrical drive potentials whereby the displacement of said first and second drive means are additive in said given direction and whereby said first and second clutch means are caused to be frictionally urged against said output member while the motion of corresponding drive means are in said given direction.